United States Patent [19]

Bowker et al.

[11] Patent Number: 5,395,709
[45] Date of Patent: Mar. 7, 1995

[54] CARBON BIPOLAR WALLS FOR BATTERIES AND METHOD FOR PRODUCING SAME

[75] Inventors: Jeffrey C. Bowker, Richland Township, Allegheny County; Kenneth C. Radford, North Huntingdon, both of Pa.; Geoffrey Barlow, South Russell; Nicholas Papadakis, Concord Township, Lake County, both of Ohio

[73] Assignee: Westinghouse Electric Corporation, Pittsburgh, Pa.

[21] Appl. No.: 137,336

[22] Filed: Oct. 18, 1993

[51] Int. Cl.$^6$ .............................................. H01M 6/46
[52] U.S. Cl. .................................... 429/152; 429/210
[58] Field of Search ............... 429/152, 153, 149, 210, 429/185, 160

[56] References Cited

U.S. PATENT DOCUMENTS

| | | | |
|---|---|---|---|
| 4,119,770 | 10/1978 | Land | 429/152 |
| 4,208,473 | 6/1980 | Bradley | 429/153 X |
| 4,275,130 | 6/1981 | Rippel et al. | 429/210 X |
| 5,162,172 | 11/1992 | Kaun . | |
| 5,264,305 | 11/1993 | Charkey | 429/152 |
| 5,336,274 | 8/1994 | Mayer et al. | 429/152 X |

Primary Examiner—Anthony Skapars

[57] ABSTRACT

A battery, having a plurality of cells stacked in series. Each of the cells having a positive electrode, a negative electrode and a separator that contain an electrolyte. The battery utilizes a thin section of carbon provided between adjacent cells as the bipolar walls. The bipolar wall may be a thin, preferably flexible, sheet of graphite. The carbon bipolar wall may also be formed by tape casting.

7 Claims, 1 Drawing Sheet

CARBON BIPOLAR WALLS FOR BATTERIES AND METHOD FOR PRODUCING SAME

BACKGROUND OF THE INVENTION

1. Field of the Invention

This invention relates to improvements in stacked multicell batteries, and more particularly to providing a conductive medium between electrodes while preventing ionically conductive paths from forming between adjacent cells and the battery case.

2. Description of the Prior Art

When constructing practical electrochemical cells into batteries, there are two basic ways in which electrodes can be connected inside the cell or battery module case. These are series and parallel connections. In a bipolar battery design, the electrodes are hooked together in series, thus the voltage of the stack is n times that of a single cell, where n is equal to the number of cells in the stack. Each cell comprises a positive and a negative electrode separated from one another by a separator. The separator is an insulative material that prevents the anode and cathode from physically touching while allowing for ionic conduction between the electrodes. Adjacent cells are separated by respective bipolar walls. The bipolar walls are plates which allow an electronic path between adjacent cells while not allowing an ionic path.

When the liquid electrolyte contacts the bipolar wall, it may either ball up or it may run across the surface of the bipolar wall. When the liquid electrolyte runs across the surface of the bipolar wall, the wall is said to be wetted by the electrolyte. It is when the bipolar wall is wetted by the electrolyte that the electrolyte might travel in an undesirable path to the adjacent cell. The bipolar wall of a lithium metal sulfide battery must have several characteristics for successful application. It must not be corroded by the electrode or electrolyte materials, it must conduct electricity through its thickness, and it must not be wet by electrolyte at its edges. The nonwetting quality is required to prevent shorting of the adjacent cells by surface tension driven creep of electrolyte around the bipolar plate.

The positive and negative electrodes of each cell contain an electrolyte which is liquid at the operating temperature. The bipolar wall separates adjacent cells and is designed to allow an electronic path between adjacent cells while not allowing an ionic path. If a path of electrolyte is allowed to travel around the bipolar wall, an ionic short develops reducing the effectiveness of the battery. Preventing an ionic short due to an electrolyte travelling around the bipolar wall ensures that all of the current flow through the bipolar wall should be electronic in nature and that there is no ionic flow.

The ideal solution to the electrolyte leakage problem is to use a minimum amount of electrolyte which is completely contained within the individual electrodes and separators by capillary forces. In practice, however, this is almost impossible since more than this minimum amount of electrolyte is required to obtain the desired electrochemical performance from the battery. Thus, means must be developed for addressing the problem of the migration of excess electrolyte.

Heretofore, metals have usually been considered for the bipolar plate because of the electrical conductivity requirement. However, metals typically used in the industry do not meet the corrosion resistance requirement or the nonwetting requirement without additional treatment. The only metal that the industry has found to meet the corrosion resistance requirement is molybdenum but molybdenum is wetted by electrolyte so that edge sealing is a problem. The molybdenum must therefore be coated with some other material to remedy the edge sealing problem. Other metals do not satisfy the corrosion resistance requirement.

Because molybdenum is relatively costly, is relatively heavy so as to add weight to the cell stack, and is easily wetted, it would be preferable to replace molybdenum with some other material as the bipolar wall material. If some other material is to be used, it will have to be coated with an electrically conductive coating which is highly resistant to attack by the electrode materials or the electrolyte. If a perfect molybdenum coating could be put down then it would work. However, this is very difficult to accomplish practically. Furthermore, even tiny imperfections (pin holes) in the coating will rapidly result in corrosion of the underlying metal plate. Depending on the coating material, it is even possible that the presence of the coating material will accelerate an attack of the underlying metal in the vicinity of the pin holes, compared to the rate of attack on an uncoated plate. Any full penetration of the plate will short adjacent cells, rendering them ineffectual.

SUMMARY OF THE INVENTION

We provide a battery having an improved bipolar wall. The battery is of the type having a plurality of cells stacked in series. Each cell comprises a positive electrode, a negative electrode and a separator, all containing an electrolyte. Between adjacent cells, a bipolar wall is placed which allows an electronic path between the adjacent cells while not allowing an ionic path. The bipolar walls of the present invention are comprised of a thin section of carbon.

One manner in which the carbon bipolar wall may be constructed is from a sheet of graphite. Flexible graphite sheets, such as Grafoil TM make effective bipolar walls. It is preferred that the carbon bipolar walls be formed so as to have a random grain orientation. The random grain orientations provide for increased conductivity between the adjacent cells. In addition to using graphite foil, the graphite bipolar wall may be prepared by applying a high compressive force to a sheet of graphite, or may be formed by cutting a thin layer of graphite from a large section of graphite.

An alternative method of creating a carbon bipolar wall is by tape casting. In this method, at least one of carbon powder and chopped carbon fiber is mixed with a solvent. Binders such as polyvinyl butyral or an acrylic, plasticizers such as polyethylene glycol and octyl phthalate, and suspension agents such as glyceryl trioleate may be added to the mixture. The mixture is then placed onto a casting surface. The solvent is allowed to evaporate leaving a carbon tape which may then be removed from the casting surface.

Other objects and advantages of the invention will become apparent from a description of certain present preferred embodiments thereof shown in the drawings.

DETAILED DESCRIPTION OF THE PREFERRED EMBODIMENTS

Figure 1:
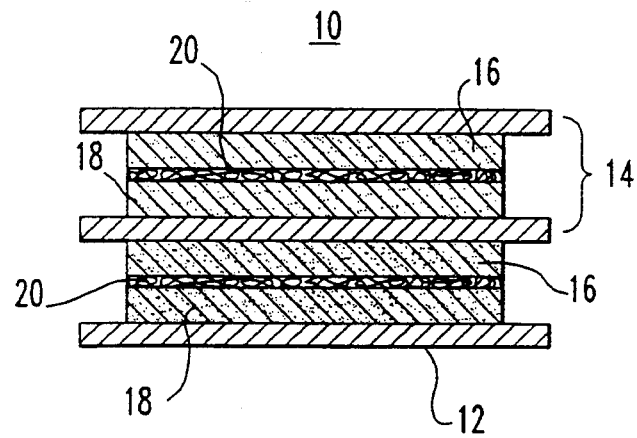
FIG. 1 is a schematic view of a series stacked multicell battery employing the preferred bipolar wall.
Figure 2:
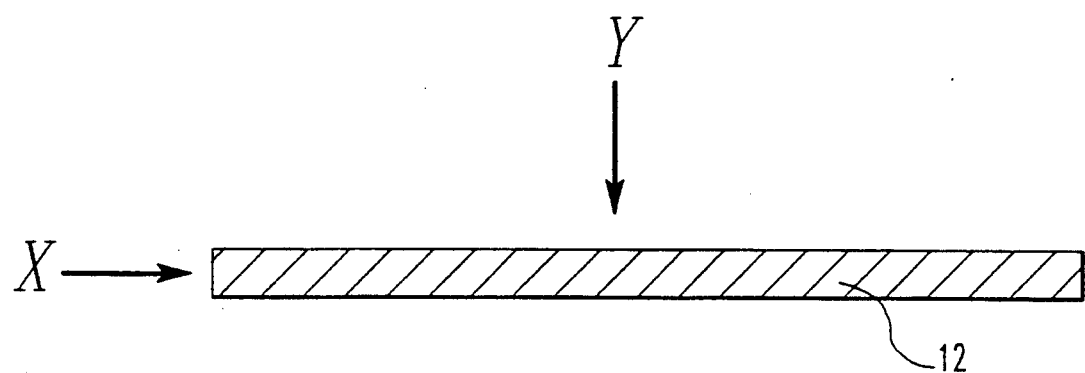
FIG. 2 is a schematic view of a bipolar wall showing directions of current travel.

Referring to FIG. 1, a portion of a series stacked battery 10 is shown that employs the preferred bipolar wall 12. The battery 10 is comprised of any number of cells 14 stacked upon one another. Each cell 14 is comprised of a positive electrode 16, a negative electrode 18 and a separator 20 which separates the positive and negative electrodes 16, 18. The positive electrodes 16, negative electrodes 18 and separators 20 of each cell 14 contain an electrolyte which is liquid at the operating temperature. The bipolar wall 12 separates adjacent cells 14 and is designed to allow an electronic path between adjacent cells 14 while not allowing an ionic path therebetween. If a path of electrolyte is allowed to travel around the bipolar wall 12, an ionic short develops reducing the effectiveness of the battery 10.

A bipolar wall material must be corrosion resistant, nonwetting and considered electrically conductive. Thermodynamic calculations indicate that carbon does not react extensively with any other material present in the cells 14. The carbon may react somewhat with the magnesium oxide separator material, but this will halt when a small pressure of carbon dioxide ($CO_2$) is generated. Creating a nonoxidizing environment in the cell 14, such as by filling the cell with a gas mixture containing a small amount of $CO_2$, will prevent any reaction between the carbon bipolar wall 12 and the other battery materials. Since carbon does not form a solid oxide, no oxide layer will form on the surface of the carbon bipolar wall 12 with which electrolyte can react. Therefore, carbon is essentially nonwettable by the electrolyte.

Common metals, at ambient temperature, have resistivities from around 0.01 to 0.1 $\mu\Omega.m$. At battery operating temperatures, the values of these resistivities are a factor of two to five times higher. The least expensive metal, low carbon steel, has a resistivity of about 0.5 $\mu\Omega.m$ at 500° C. The actual difference in performance will also depend on the thickness of the material used. Thin sheet carbon may be less expensive than metals of equivalent thickness.

Sheets of flexible graphite such as Union Carbide's Grafoil TM may be used as the bipolar walls. The resistivity of Grafoil TM differs between the in plane direction (designated by the arrow marked X) and the through thickness direction (designated by the arrow marked Y). Through the thickness of the Grafoil TM sheet, the resistivity is on the order of 1 $\Omega.m$ (the values of the resistivity of Grafoil TM vary slightly with temperature). The resistivity may be reduced by applying pressure to the sheet, but a considerable pressure, in excess of 500 kPa, is required to reduce the resistivity significantly. In contrast, the resistivity in the plane of the Grafoil TM sheet is much lower (on the order of 8 $\mu\Omega.m$). However, even the resistivity through the thickness of the Grafoil TM sheet is low compared to that of true insulators like most oxides and many nitrides, which have resistivities at 500° C. ranging from 1 $\mu\Omega.m$ to 1 $T\Omega.m$. At this temperature, metals have resistivities on the order of 1 $\mu\Omega.m$.

In addition to utilizing commercially available flexible graphite, carbon bipolar walls may be produced by other means. One way to produce a bipolar wall sheet having acceptable conductivity is to apply a high compressible force to a sheet of graphite. A compressive force of around $3.45 \times 10^5$ kPa produces sufficient conductivity. A sheet of approximately 0.1 mm is preferred.

The resistivity of the graphite bipolar wall 12 may be lowered by producing graphite by methods which yield random grain orientations. The resistivity through the thickness of graphite produced by these methods is likely to be near that of Grafoil TM in the plane direction. Carbon/carbon composites are also likely to exhibit such resistivity values. One way in which a bipolar sheet may be produced having a random grain orientation involves growing a large section of graphite. Extremely thin layers are then cut from the larger section of the graphite.

A preferred method of preparing an inexpensive thin carbon sheet with acceptable properties is tape casting. In this tape casting process, a mixture is created in which small pieces of carbon, such as carbon powder and chopped carbon fiber, are mixed with organic binders such as polyvinyl butyral or an acrylic. Suspension agents such as glyceryl trioleate may then be added to the mixture. Suspension agents impart charge to the particles in the mixture to suspend the particles. Plasticizers such as polyethelene glycol or octyl phthalate may also be added to the mixture.

The carbon, binders, suspension agents and plasticizers are mixed together in a solvent such as a mixture of toluene and ethanol and are cast onto a sheet of some polymer such as Mylar TM. The solvent is then left to evaporate from the polymer sheet leaving the carbon with the other agents as a sheet. This sheet is peeled off the polymer substrate and is pyrolyzed or heat treated. The pyrolysis occurs in an inert or reducing atmosphere to prevent oxidation of the carbon. Because the resulting product is not graphitic, it will have electrical properties which are approximately the same both in plane and through thickness. The chopped carbon fiber would provide adequate strength for this application.

Regardless of which method or means is chosen for providing the carbon bipolar wall, the bipolar wall must be produced by a method that will produce adequate electrical properties in the through-thickness direction. Additionally, the bipolar wall must be sufficiently nonporous so that liquid electrolyte will not penetrate the bipolar wall at the operating temperature.

While certain present preferred embodiments have been shown and described, it is distinctly understood that the invention is not limited thereto but may be otherwise embodied within the scope of the following claims.

We claim:

1. A battery, comprising:
    (a) a plurality of cells stacked in series, each cell being comprised of a positive electrode, a negative electrode and a separator that contain an electrolyte; and
    (b) at least one bipolar wall made of a thin section of carbon, each at least one carbon bipolar wall being provided between adjacent pairs of cells.

2. The battery of claim 1 wherein the carbon bipolar wall is made of graphite.

3. The battery of claim 2 wherein the carbon bipolar wall is a sheet of flexible graphite.

4. The battery of claim 2 wherein the graphite bipolar wall has a random grain orientation.

5. The battery of claim 2 wherein the graphite bipolar wall is prepared by applying a high compressive force to a sheet of graphite.

6. The battery of claim 2 wherein the graphite bipolar wall is formed by cutting a thin layer of graphite from a large section of graphite.

7. The battery of claim 1 wherein the carbon bipolar wall is formed by tape casting.

* * * * *